(12) United States Patent
Graf et al.

(10) Patent No.: US 7,705,604 B2
(45) Date of Patent: Apr. 27, 2010

(54) ELECTRIC CIRCUIT FOR TRIGGERING A PIEZOELECTRIC ELEMENT, IN PARTICULAR OF A FUEL INJECTION SYSTEM OF A MOTOR VEHICLE

(75) Inventors: Marco Graf, Ditzingen (DE); Joerg Reineke, Ditzingen (DE); Mirko Schinzel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 180 days.

(21) Appl. No.: 11/792,539

(22) PCT Filed: Oct. 20, 2005

(86) PCT No.: PCT/EP2005/055421

§ 371 (c)(1),
(2), (4) Date: Sep. 14, 2007

(87) PCT Pub. No.: WO2006/061289

PCT Pub. Date: Jun. 15, 2006

(65) Prior Publication Data

US 2008/0036465 A1    Feb. 14, 2008

(30) Foreign Application Priority Data

Dec. 6, 2004    (DE) .................. 10 2004 058 672

(51) Int. Cl.
*G01R 31/08*    (2006.01)
*G01R 1/20*    (2006.01)
*F02M 51/00*    (2006.01)
*F02M 37/04*    (2006.01)

(52) U.S. Cl. .................. 324/522; 324/126; 123/490; 123/498

(58) Field of Classification Search .................. 324/522, 324/126; 123/490, 498
See application file for complete search history.

(56) References Cited

U.S. PATENT DOCUMENTS 6,384,512 B1 * 5/2002 Maeda .................. 310/316.03
6,522,049 B2 * 2/2003 Rueger .................. 310/319

FOREIGN PATENT DOCUMENTS

| DE | 10151421 | 5/2002 |
|---|---|---|
| DE | 10158553 | 6/2002 |
| DE | 10314565 | 11/2003 |
| EP | 1139442 | 10/2001 |

\* cited by examiner

*Primary Examiner*—Amy He
(74) *Attorney, Agent, or Firm*—Kenyon & Kenyon LLP

(57) ABSTRACT

An electric circuit for triggering a piezoelectric element, a fuel injection system of a motor vehicle in particular, is described. A first measuring shunt connected in series to the piezoelectric element is provided. Provided are two transistors connected in series whose shared connecting point is connected to the piezoelectric element. A second measuring shunt is also provided. The two transistors and the second measuring shunt are connected in series.

20 Claims, 4 Drawing Sheets

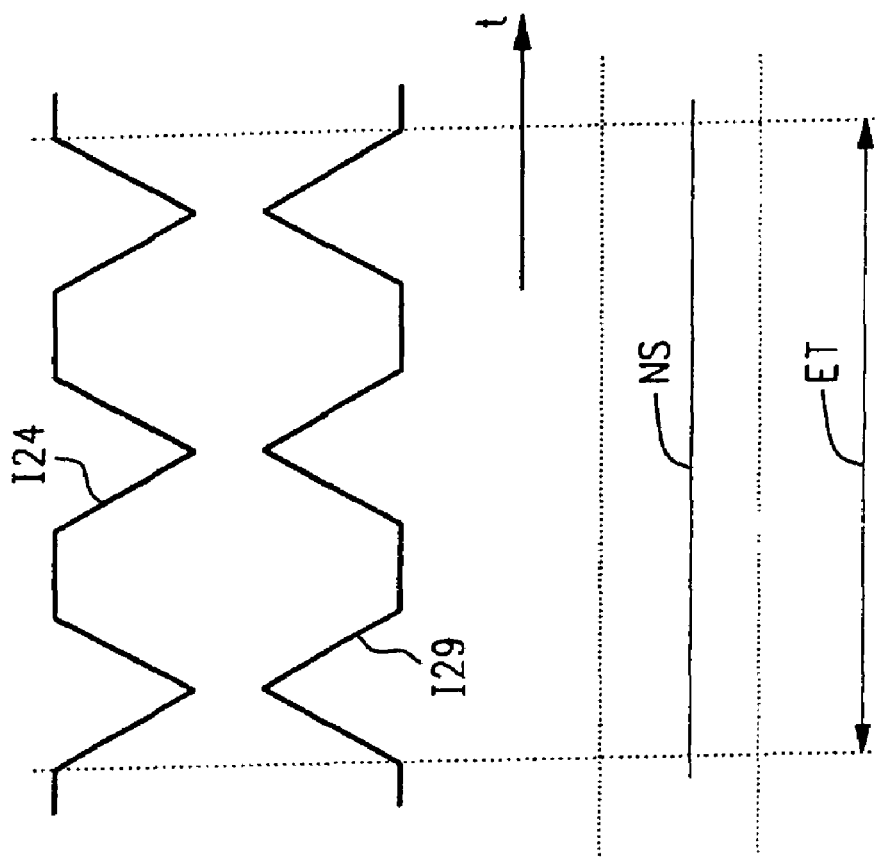
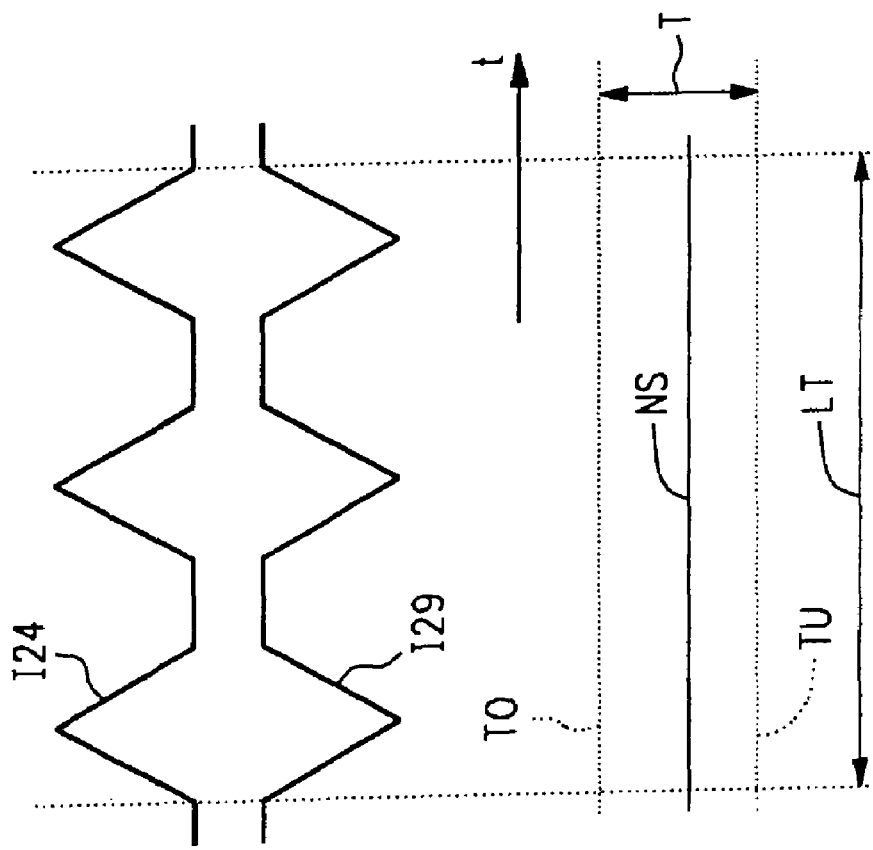

ELECTRIC CIRCUIT FOR TRIGGERING A PIEZOELECTRIC ELEMENT, IN PARTICULAR OF A FUEL INJECTION SYSTEM OF A MOTOR VEHICLE

FIELD OF THE INVENTION

The present invention is directed to an electric circuit for triggering a piezoelectric element, of a fuel injection system of a motor vehicle in particular. The present invention also relates to a corresponding method for triggering a piezoelectric element, as well as a corresponding computer program, a corresponding electric memory medium, and a corresponding control unit for a fuel injection system of a motor vehicle in particular.

BACKGROUND INFORMATION

An electric circuit is known from European Patent Publication No. EP 1 139 422, where a plurality of series circuits having a piezoelectric element and a transistor are connected in parallel. A first measuring shunt is grounded in series with the parallel circuit. The parallel circuit is also connected, via an inductor coil, to the shared connection point of two transistors grounded in series. A series circuit of a capacitor and a second measuring shunt is grounded in parallel to the two transistors.

In European Patent Publication No. EP 1 139 442, a check is performed prior to a charging operation or a discharging operation, i.e., prior to a current flowing through one of the piezoelectric elements, to determine whether the piezoelectric element has a short circuit. For this purpose, a check is performed during a predefined time period prior to the charging or discharging operation to determine whether a current is flowing through one of the measuring shunts. If this is the case, there is a fault.

This check requires a certain amount of time which therefore cannot be used for the charging or discharging operation. As a result, for example, small injected amounts in the case of a fuel injection system of a motor vehicle can be metered by the piezoelectric elements only with reduced accuracy.

SUMMARY OF THE INVENTION

An object of the present invention is to provide an electric circuit for triggering a piezoelectric element which makes it possible to check for possible faults in a simple manner without disadvantages, for example, with regard to injections of small amounts having to be accepted.

The two transistors and the second measuring shunt are connected in series according to the present invention. In contrast with European Patent Publication No. EP 1 139 442, the current thus always flows through the second measuring shunt during the entire charging or discharging operation of one of the piezoelectric elements. This makes it possible to monitor the current flowing through the corresponding piezoelectric element with the aid of the two measuring shunts during the entire charging or discharging operation.

Therefore, the performance reliability of the electric circuit according to the present invention may thus be while charging or discharging one of the piezoelectric elements. Checking the electric circuit prior to the charging or discharging operation, as performed in European Patent Publication No. EP 1 139 442, is therefore unnecessary. The time period needed for this purpose is no longer required. Checking the electric circuit according to the present invention thus has no negative effect, for example, on the injection of small quantities of fuel in the case of a fuel injection system of a motor vehicle.

A control unit which is connected to the two measuring shunts and is able to detect the currents flowing through the two measuring shunts is provided in an advantageous refinement of the present invention. Due to the series connection of the two transistors and the second measuring shunt, the currents may be detected by the control unit during the entire charging or discharging operation of the piezoelectric element. The control unit thus does not need to perform a check prior to the actual charging or discharging operation. As mentioned previously, the time needed for this purpose is no longer required.

It is expedient in particular if the two currents flowing through the two measuring shunts have approximately the same absolute value and if the control unit recognizes a fault if this is not the case. This represents a very simple, yet reliable check of the performance reliability of the electric circuit according to the present invention.

In an advantageous embodiment of the present invention, the control unit adds up the two currents flowing through the two measuring shunts and recognizes a fault if the resulting current exceeds a tolerance range.

BRIEF DESCRIPTION OF THE DRAWINGS

FIGS. 2a and 2b show the circuit of FIG. 1 with current paths drawn in.

FIGS. 3a and 3b show schematic time diagrams of electric currents in the circuits of FIGS. 2a and 2b.

DETAILED DESCRIPTION

Figure 1:
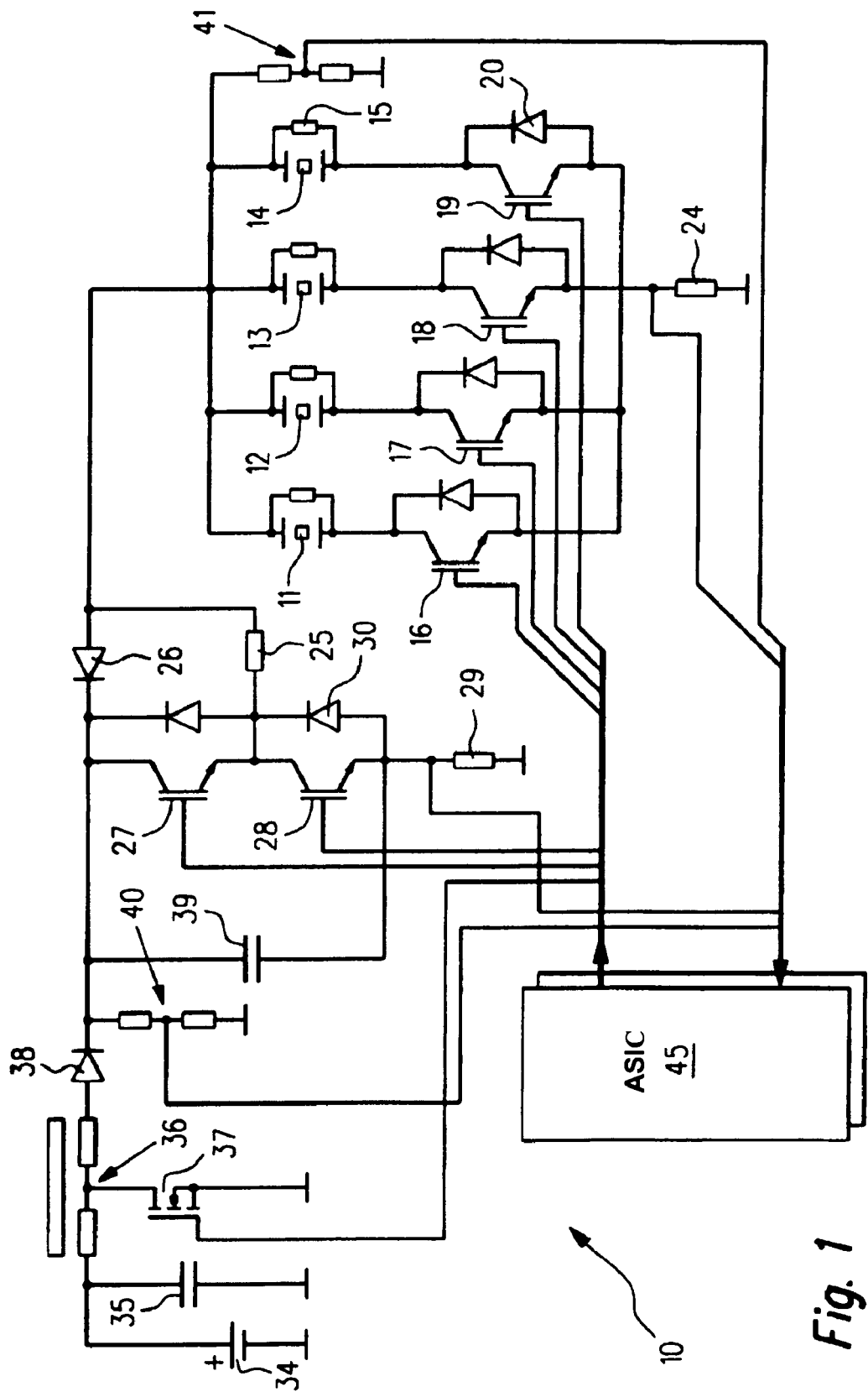
FIG. 1 shows a schematic block diagram of an electric circuit for triggering piezoelectric elements, in particular of a fuel injection system of a motor vehicle.

FIG. 1 shows an electric circuit 10, which has four piezoelectric elements 11, 12, 13, 14. Of course, a different number of piezoelectric elements may also be provided. Piezoelectric elements 11, 12, 13, 14 may be used, in particular in a fuel injection system of a motor vehicle for injecting fuel.

A resistor 15 is connected in parallel to each of piezoelectric elements 11, 12, 13, 14. Furthermore, a transistor 16, 17, 18, 19 is connected in series to each of piezoelectric elements 11, 12, 13, 14. A freewheeling diode 20 is connected in parallel to each of transistors 16, 17, 18, 19.

The four piezoelectric elements 11, 12, 13, 14 are connected in parallel to one another. The four transistors 16, 17, 18, 19, connected in series to piezoelectric elements 11, 12, 13, 14, are thus also connected in parallel to one another. On the side of these transistors 16, 17, 18, 19, the parallel circuit is grounded using a first measuring shunt 24.

First measuring shunt 24 measures the current. Of course, instead of first measuring shunt 24, other current-measuring means may also be used.

On the other side, i.e., on the side of piezoelectric elements 11, 12, 13, 14, the parallel circuit is connected to a coil 25 and to the anode of a safety freewheeling diode 26. The cathode of the safety freewheeling diode 26 is grounded via the series circuit of two transistors 27, 28 and a second measuring shunt 29.

Second measuring shunt 29 measures the current. Of course, instead of second measuring shunt 29, other current-measuring means may also be used.

A freewheeling diode 30 is connected in parallel to each of the two transistors 27, 28. The shared connecting point of the two transistors 27, 28 is connected to coil 25.

The previously explained circuit 10 is supplied with power from a grounded battery 34. A smoothing capacitor 35 is grounded in parallel to battery 34. The positive terminal of battery 34 is connected to a DC-DC converter 36, which is controlled by a grounded transistor 37. The side of DC-DC converter 36 facing away from battery 34 is connected to the anode of a diode 38, whose cathode is connected to the cathode of safety freewheeling diode 26.

A capacitor 39, which is also connected to second measuring shunt 29, is connected to this shared connecting point of the two diodes 26, 38. Furthermore, a grounded voltage divider 40 is connected to this shared connecting point. Another voltage divider 41 is grounded by the anode of safety freewheeling diode 26.

Transistors 16, 17, 18, 19, assigned to piezoelectric elements 11, 12, 13, 14, the two transistors 27, 28, and transistor 37 assigned to DC-DC converter 36 are connected to and controlled by an ASIC 45 (ASIC—Application-Specific Integrated Circuit). The two measuring shunts 24, 29 and the two voltage dividers 40, 41 are also connected and deliver their currents to this ASIC 45.

Electric circuit 10 is thus triggered by ASIC 45. ASIC 45, in turn, is triggered by a microprocessor (not shown). ASIC 45 thus represents the interface between circuit 10 forming an output stage and the microprocessor.

Electric circuit 10, ASIC 45, and the microprocessor together form a control unit. Piezoelectric elements 11, 12, 13, 14 are outside the control unit and also outside electric circuit 10, i.e., the above-mentioned ASIC 45, and connected to electric circuit 10 via connecting lines, for example, a cable harness.

The control unit is used for controlling and/or regulating the currents supplied to piezoelectric elements 11, 12, 13, 14. For this purpose, the control unit has a computer in the form of the above-mentioned microprocessor having an electric memory medium, a flash memory in particular. A computer program capable of running on the computer is stored on the memory medium. This computer program is suitable for influencing the currents through piezoelectric elements 11, 12, 13, 14 and thus for performing the desired control and/or regulation.

Battery 34 has a DC voltage of 12 V or 24 V, for example. This DC voltage is transformed to 240 V, for example, by DC-DC converter 36. This stepped-up DC voltage is applied to voltage divider 40, so that this voltage may be ascertained by ASIC 45 via voltage divider 40. The stepped-up DC voltage also charges capacitor 39. The voltage applied to capacitor 39 is also applied to the series circuit of the two transistors 27, 28.

Only one of the two transistors 27, 28 is triggered each time by ASIC 45. Furthermore, when triggered, the two transistors 27, 28 are cyclically switched to the conductive state. When transistor 27 is switched to the conductive state, one of piezoelectric elements 11, 12, 13, 14 may be charged. However, if transistor 28 is switched to the conductive state, one charged piezoelectric element 11, 12, 13, 14 may be discharged. The voltage applied to the particular piezoelectric element 11, 12, 13, 14 may be ascertained by ASIC 45 with the aid of voltage divider 41. The rise of the current flowing during charging or discharging is limited by coil 25. With the help of transistors 16, 17, 18, 19, ASIC 45 may select the piezoelectric element 11, 12, 13, 14 to be charged.

Charging one of piezoelectric elements 11, 12, 13, 14 is elucidated below with reference to FIGS. 2a, 3a.

For example, if piezoelectric element 11 is to be charged, transistors 16, 27 are first switched to a conductive state by ASIC 45. A current flows from capacitor 39 through conductive transistor 27, coil 25, piezoelectric element 11, conductive transistor 16, first measuring shunt 24, and ground, and back to capacitor 39 via second measuring shunt 29. This current path is indicated in FIG. 2a by solid line 46.

Transistor 27 is then blocked. A current flows from coil 25 through piezoelectric element 11, conductive transistor 16, first measuring shunt 24, ground, second measuring shunt 29, and through the lower of the two freewheeling diodes 30 back to coil 25. This current path is indicated in FIG. 2a by dashed line 47.

Transistor 27 is then switched again to a conductive state, so that a current according to path 46 flows again. Transistor 27 continues to be cycled until piezoelectric element 11 is charged to a desired voltage.

In FIG. 3a, the currents flowing through the two measuring shunts 24, 29 are plotted over time t. Current I24 shown in the upper diagram is the current through measuring shunt 24, and current I29 shown in the lower diagram is the current through measuring shunt 29. Furthermore, charging time LT during which transistor 27 is cycled to charge piezoelectric element 11 as desired is shown in FIG. 3a.

Figure 2A:
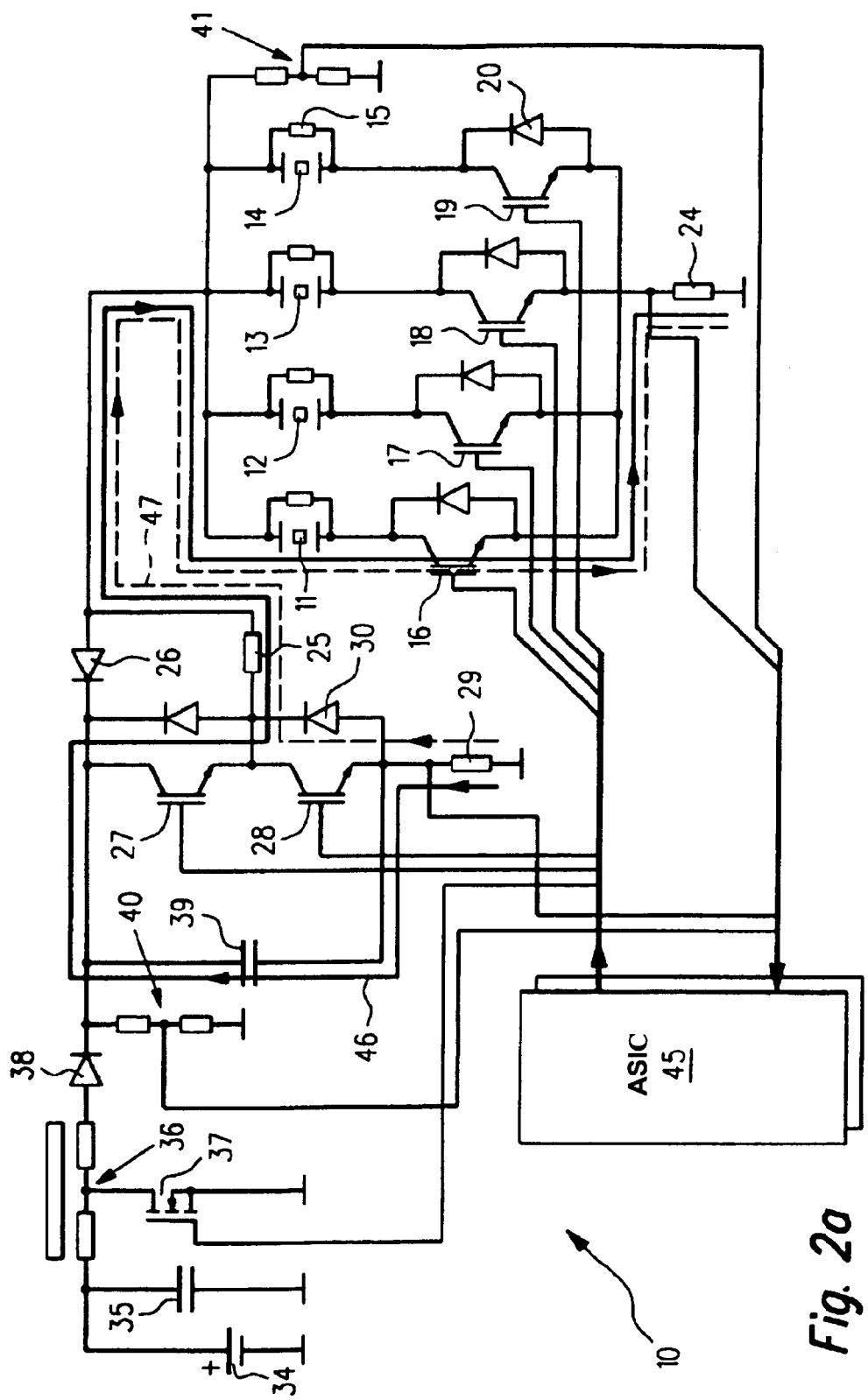

The two current paths 46, 47 of FIG. 2a show that the current through measuring shunt 24 also always flows through measuring shunt 29. The absolute value of current I24 is therefore always equal to that of current I29. Furthermore, current paths 46, 47 of FIG. 2a show that the two currents I24, I29 always flow in opposite directions and thus with opposite signs through the two measuring shunts 24, 29. This results overall in the curve of the two currents I24, I29 shown in the two diagrams of FIG. 3a.

The rising edge of current I24 of FIG. 3a corresponds to current path 46 of FIG. 2a, while the falling edge of current I24 corresponds to current path 47. Conversely, the falling edge of current I29 of FIG. 3a corresponds to current path 46 of FIG. 2a, and the rising edge of current I29 corresponds to path 47.

As explained above, the two measuring shunts 24, 29 are connected to ASIC 45. The two currents I24, I29 flowing through measuring shunts 24, 29 may therefore be detected by ASIC 45. The two currents I24, I29 are then added up by ASIC 45. Due to the opposite signs and equal absolute values of the two currents I24, I29, this addition results in a current NS. This is shown in the third diagram of FIG. 3a.

The discharge of one of piezoelectric elements 11, 12, 13, 14 is basically identical to the charge of one of piezoelectric elements 11, 12, 13, 14 as explained above, the direction of current changing in particular. This discharge is elucidated below with reference to FIGS. 2b, 3b.

Figure 2B:
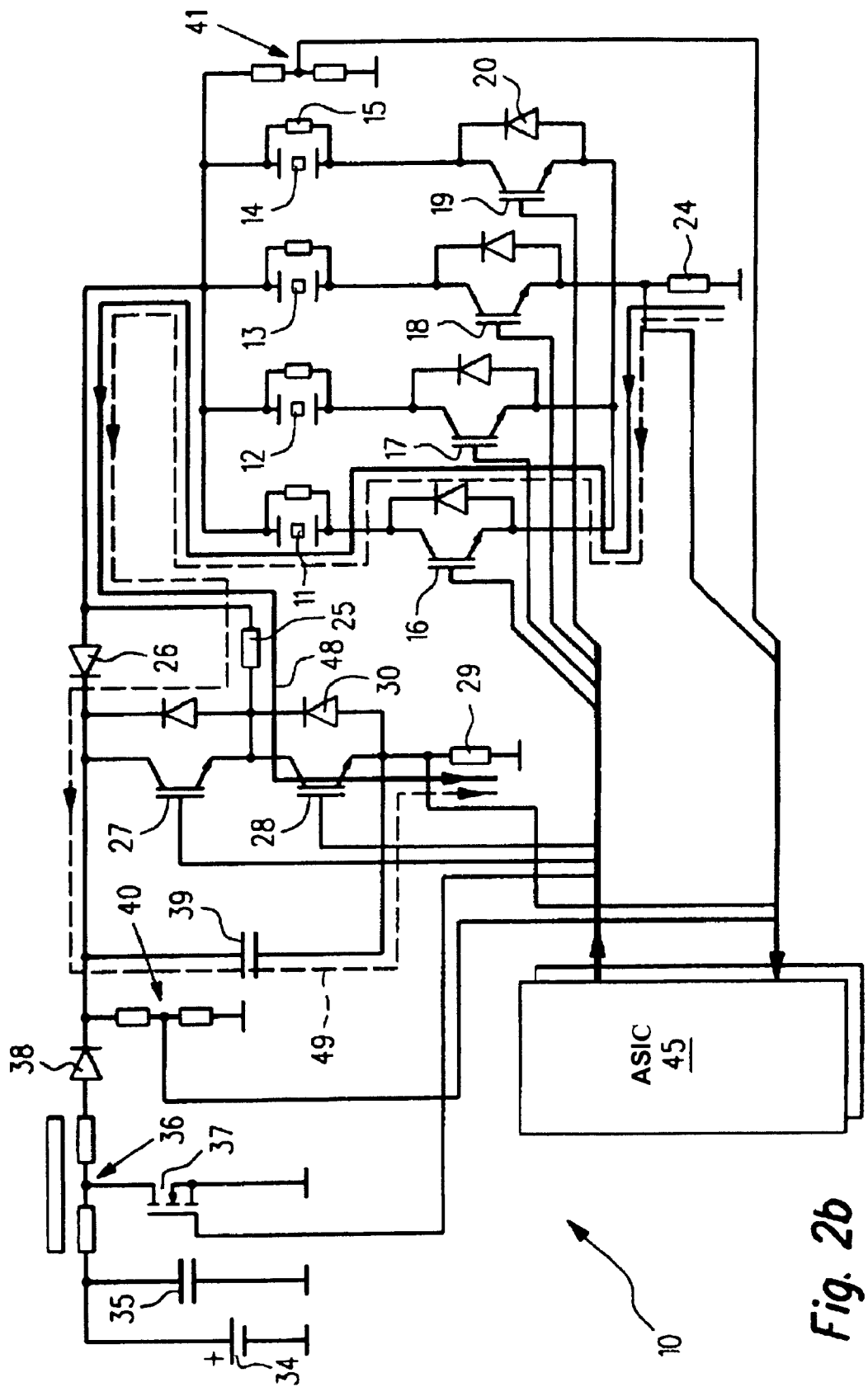

For example, if piezoelectric element 11 is to be discharged, transistor 28 and transistor 16 are first switched to a conductive state by ASIC 45. A current flows on a path as shown in FIG. 2b by solid line 48. Transistor 28 is subsequently blocked. A current flows on a path as shown in FIG. 2b by dashed line 49. Transistor 28 is then switched again to a conductive state, so that a current according to path 48 flows again. Transistor 28 continues to be cycled until piezoelectric element 11 is discharged as desired.

In FIG. 3b, the currents flowing through the two measuring shunts 24, 29 are plotted over time t. Current I24 shown in the upper diagram is the current through measuring shunt 24, and current I29 shown in the lower diagram is the current through measuring shunt 29. Furthermore, charging time ET during which transistor 28 is cycled to discharge piezoelectric element 11 as desired is shown in FIG. 3b.

The two current paths 48, 49 of FIG. 2b show that the current through measuring shunt 24 also always flows through measuring shunt 29. Furthermore, the absolute value of current I24 is always equal to that of current I29. Current paths 48, 49 of FIG. 2b also show that the two currents I24, I29 always flow in opposite directions and thus with opposite signs through the two measuring shunts 24, 29. This results overall in the curves of the two currents I24, I29 shown in the two diagrams of FIG. 3b.

The falling edge of current I24 of FIG. 3b corresponds to current path 48 of FIG. 2b, while the rising edge of current I24 corresponds to current path 49. Conversely, the rising edge of current I29 of FIG. 3b corresponds to current path 48 of FIG. 2b, and the falling edge of current I29 corresponds to path 49.

As explained above, the two measuring shunts 24, 29 are connected to ASIC 45. The two currents I24, I29 flowing through measuring shunts 24, 29 may therefore be detected by ASIC 45. The two currents I24, I29 are subsequently added up. Due to the opposite signs and equal absolute values of the two currents I24, I29, this addition results in a current NS. This is shown in the third diagram of FIG. 3b.

In both cases, i.e., when charging or discharging piezoelectric element 11, current NS is monitored by the control unit for the observance of predefined limits. FIGS. 3a, 3b thus show an upper limit TO and a lower limit TU, which define a tolerance range T.

The control unit now monitors whether current NS is within this tolerance range T. If this is the case, functioning of electric circuit 10 which is correct at least to this extent is inferred therefrom.

In the cases of fault as explained below, however, current NS exceeds tolerance range T. This is detected by the control unit, and a fault in electric circuit 10 is inferred therefrom.

In the event of a short circuit of one of the two connecting lines of one of piezoelectric elements 11, 12, 13, 14 to the positive terminal of battery 34 and thus to the DC voltage delivered by battery 34, a current flows, after the transistor belonging to the short-circuited piezoelectric element has been switched to the conductive state, from the short-circuited piezoelectric element through the corresponding transistor switched to the conductive state and through first measuring shunt 24 to ground. However, no current flows through second measuring shunt 29. The addition of the two currents I24, I29 thus results in a current NS substantially different from zero. This results in tolerance range T being exceeded and thus the short circuit being detected.

In the event of a short circuit of one of the two connecting lines of one of piezoelectric elements 11, 12, 13, 14 to ground, a current flows through second measuring shunt 29, capacitor 39, conductive transistor 27, and coil 25 to the grounded piezoelectric element when the piezoelectric element is charged. However, no current flows through first measuring shunt 24. The addition of the two currents I24, I29 thus results in a current NS substantially different from zero. This results in tolerance range T being exceeded and thus the fault being detected.

If the control unit recognizes a fault as explained above, all triggering of transistors 11, 12, 13, 14 and transistors 27, 28 is interrupted and electric circuit 10 is switched to a safe operating mode.

Electric circuit 10 may be monitored continuously for faults as explained above. In particular, the above-explained method is performed only when one of transistors 16, 17, 18, 19 is triggered.

What is claimed is:

1. An electric circuit for triggering a piezoelectric element of a fuel injection system of a motor vehicle, comprising:
    a first current-measuring arrangement including a first measuring shunt and connected in series to the piezoelectric element;
    two transistors connected in series, a shared connecting point of the two transistors being connected to the piezoelectric element;
    a second current-measuring arrangement including a second measuring shunt; and
    a control unit that:
        compares a first current flowing through the first current-measuring arrangement with a second current flowing through the second current-measuring arrangement; and
        detects a fault if absolute values of the first current and the second current are not approximately equal.

2. The electric circuit as recited in claim 1, wherein:
    the control unit is connected to the first current-measuring arrangement and the second current-measuring arrangement, and detects the first current flowing through the first current-measuring arrangement and the second current flowing through the second current-measuring arrangement; and
    the first current and the second current are detectable by the control unit during one of an entire charging operation and an entire discharging operation of the piezoelectric element.

3. An electric circuit for triggering a piezoelectric element of a fuel injection system of a motor vehicle, comprising:
    a first current-measuring arrangement including a first measuring shunt and connected in series to the piezoelectric element;
    two transistors connected in series, a shared connecting point between the two transistors being connected to the piezoelectric element;
    a second current-measuring arrangement including a second measuring shunt, wherein the two transistors and the second current-measuring arrangement are connected in series; and
    a capacitor to which the two transistors are connected in parallel, wherein the capacitor and the second current-measuring arrangement form a series circuit.

4. The electric circuit as recited in claim 3, further comprising:
    a control unit connected to the first current measuring arrangement and the second current-measuring arrangement, wherein the control unit detects a first current flowing through the first current measuring arrangement and a second current flowing through the second current-measuring arrangement, wherein the first current and the second current are detectable by the control unit during one of an entire charging operation and an entire discharging operation of the piezoelectric element.

5. The electric circuit as recited in claim 4, wherein the control unit:
    compares the first current flowing through the first current-measuring arrangement with the second current flowing through the second current-measuring arrangement; and
    detects a fault if absolute values of the first current and the second current are not approximately equal.

6. The electric circuit as recited in claim 3, further comprising:
    a control unit that:
        compares a first current flowing through the first current-measuring arrangement with a second current flowing through the second current-measuring arrangement; and
        detects a fault if absolute values of the first current and the second current are not approximately equal.

7. An electric circuit for triggering a piezoelectric element of a fuel injection system of a motor vehicle, comprising:

a first current-measuring arrangement including a first measuring shunt and connected in series to the piezoelectric element;

two transistors connected in series, a shared connecting point between the two transistors being connected to the piezoelectric element;

a second current-measuring arrangement including a second measuring shunt, wherein the two transistors and the second current-measuring arrangement are connected in series; and a control unit connected to the first current measuring arrangement and the second current-measuring arrangement, wherein the control unit detects a first current flowing through the first current measuring arrangement and a second current flowing through the second current-measuring arrangement, wherein the first current and the second current are detectable by the control unit during one of an entire charging operation and an entire discharging operation of the piezoelectric element;

wherein:
  absolute values of the first current and the second current are approximately equal; and
  the control unit detects a fault if the absolute values are not approximately equal.

8. The electric circuit as recited in claim 7, wherein:
the control unit adds up the first current and the second current to produce a resulting current; and
the control unit detects a fault if the resulting current exceeds a tolerance range.

9. The electric circuit as recited in claim 8, further comprising:
  a capacitor to which the two transistors are connected in parallel, wherein the capacitor and the second current-measuring arrangement form a series circuit.

10. The electric circuit as recited in claim 7, further comprising:
  a capacitor to which the two transistors are connected in parallel, wherein the capacitor and the second current-measuring arrangement form a series circuit.

11. A method for triggering a piezoelectric element of a fuel injection system of a motor vehicle by a device in which a first current-measuring arrangement that includes a first measuring shunt is connected in series to the piezoelectric element, in which a shared connecting point of two transistors connected in series is connected to the piezoelectric element, and in which a second current-measuring arrangement that includes a second measuring shunt is provided, the method comprising:
  comparing a first current flowing through the first current measuring arrangement with a second current flowing through the second current measuring arrangement; and
  detecting a fault if absolute values of the first current and the second current are not approximately equal.

12. The method as recited in claim 11, further comprising:
adding up the first current and the second current to produce a resulting current; and
recognizing the fault if the resulting current exceeds a tolerance range.

13. The method as recited in claim 11, wherein the method is implemented as a computer program.

14. The method as recited in claim 13, wherein the computer program is stored on a memory medium.

15. The method as recited in claim 11, wherein the method is performed by a control unit.

16. The method as recited in claim 11, further comprising:
  detecting, during one of an entire charging operation and an entire discharging operation of the piezoelectric element, the first current flowing through the first current measuring-arrangement and the second current flowing through the second current-measuring arrangement.

17. A hardware embodied computer-readable medium having stored thereon instructions, the instructions which when executed cause a processor to perform a method for triggering a piezoelectric element of a fuel injection system of a motor vehicle by a device in which a first current-measuring arrangement that includes a first measuring shunt is connected in series to the piezoelectric element, in which a shared connecting point of two transistors connected in series is connected to the piezoelectric element, and in which a second current-measuring arrangement that includes a second measuring shunt is provided, the method comprising:
  comparing a first current flowing through the first current measuring arrangement with a second current flowing through the second current measuring arrangement; and
  detecting a fault if absolute values of the first current and the second current are not approximately equal.

18. The computer-readable medium as recited in claim 17, wherein the method further comprises:
  adding up the first current and the second current to produce a resulting current; and
  recognizing the fault if the resulting current exceeds a tolerance range.

19. A control unit including hardware circuitry adapted for connection to (a) a first current-measuring arrangement that includes a first measuring shunt and that is connected in series to a piezoelectric element of a fuel injection system of a motor vehicle and (b) a second current-measuring arrangement that includes a second measuring shunt, wherein a shared connecting point of two transistors connected in series is connected to the piezoelectric element, the control unit configured for performing a method for triggering the piezoelectric element, the method comprising:
  comparing a first current flowing through the first current measuring arrangement with a second current flowing through the second current measuring arrangement; and
  detecting a fault if absolute values of the first current and the second current are not approximately equal.

20. The control unit as recited in claim 19, wherein the method further comprises:
  adding up the first current and the second current to produce a resulting current; and
  recognizing the fault if the resulting current exceeds a tolerance range.

* * * * *